(12) United States Patent
Yuge et al.

(10) Patent No.: US 8,982,222 B2
(45) Date of Patent: Mar. 17, 2015

(54) IMAGE STABILIZATION APPARATUS

(71) Applicants: Olympus Imaging Corp., Shibuya-ku, Tokyo (JP); Olympus Corporation, Shibuya-ku, Tokyo (JP)

(72) Inventors: Kazunori Yuge, Tokorozawa (JP); Yoshiaki Sueoka, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 0 days.

(21) Appl. No.: 14/054,400

(22) Filed: Oct. 15, 2013

(65) Prior Publication Data

US 2014/0152860 A1    Jun. 5, 2014

(30) Foreign Application Priority Data

Dec. 4, 2012  (JP) ................................ 2012-265541

(51) Int. Cl.
  *H04N 5/228*  (2006.01)
  *H04N 5/232*  (2006.01)
  *G02B 27/64*  (2006.01)

(52) U.S. Cl.
  CPC .......... *H04N 5/23287* (2013.01); *G02B 27/646* (2013.01)
  USPC ...................... 348/208.11; 348/208.7; 396/55

(58) Field of Classification Search
  USPC .................. 348/208.11, 208.7, 208.4; 396/55
  See application file for complete search history.

(56) References Cited

U.S. PATENT DOCUMENTS

| | | | |
|---|---|---|---|
| 2004/0141735 A1* | 7/2004 | Nomura | 396/72 |
| 2007/0182825 A1* | 8/2007 | Nomura et al. | 348/208.99 |
| 2011/0134528 A1* | 6/2011 | Suzuka | 359/554 |
| 2012/0070138 A1* | 3/2012 | Onishi et al. | 396/55 |
| 2012/0218429 A1* | 8/2012 | Suzuka | 348/208.11 |

FOREIGN PATENT DOCUMENTS

| | | | |
|---|---|---|---|
| JP | 2007163961 A | * | 6/2007 |
| JP | 2011-237519 A | | 11/2011 |

* cited by examiner

*Primary Examiner* — Sinh Tran
*Assistant Examiner* — Zhenzhen Wu
(74) *Attorney, Agent, or Firm* — Holtz, Holtz, Goodman & Chick PC

(57) ABSTRACT

A image stabilization apparatus includes a support member, a holder where a lens is movable between a retraction position and a vibration-prevention-and-correction region, an urging member that urges the holder in a direction of the vibration-prevention-and-correction region, and a drive member that causes the lens in the vibration-prevention-and-correction region to move to the retraction position when the drive member is in a first positional relation relative to the holder, and allows movement of the lens located in the retraction position to the vibration-prevention-and-correction region direction when the drive member is in a second positional relation relative to the holder, wherein when the holder and the drive member are in the second positional relation, the urging member causes the lens to move to the vibration-prevention-and-correction region from the retraction position, and in the position, enables movement of the holder within a plane perpendicular to the optical axis.

10 Claims, 9 Drawing Sheets

IMAGE STABILIZATION APPARATUS

CROSS REFERENCE TO RELATED APPLICATION

This application claims the benefit of Japanese Application No. 2012-265541 filed in Japan on Dec. 4, 2012, the contents of which are incorporated herein by this reference.

BACKGROUND OF THE INVENTION

1. Field of the Invention

The present invention relates to a image stabilization apparatus that restrains image blur by moving some lens groups out of a plurality of lens groups configuring a shooting optical system in a direction orthogonal to an optical axis.

2. Description of the Related Art

Conventionally, a shooting apparatus such as a digital camera and a video camera (hereinafter, generically called a camera), for example, has been generally put to practical use and become widespread, that converts optical images formed by a shooting optical system into image signals in sequence by a photoelectric conversion element or the like, can record the image signals obtained thereby in a recording medium as image data in a predetermined form, and is configured by including an image display apparatus such as a liquid crystal display device (LCD), for example, that reproduces and displays the image data recorded in the recording medium as an image.

In the above kind of cameras, the one that includes a image stabilization apparatus for restraining degradation of image quality due to so-called image blur that occurs when shooting is performed is put to practical use. As the image stabilization apparatus, various apparatuses of various methods are proposed and put to practical use, such as an apparatus of an image pickup device shift method that properly moves an image pickup device in a direction (an X direction and a Y direction) orthogonal to an optical axis of the shooting optical system, and an apparatus of an optical method that properly moves some lens groups out of a plurality of lens groups configuring a shooting optical system in the direction (the X direction and the Y direction) orthogonal to the optical axis, for example.

In the conventional cameras, some of the cameras include so-called collapsible lens barrels that collapse lens barrels configuring shooting optical systems when the cameras are not used, namely, when the cameras are carried or in storage. Further, in the collapsible lens barrels, the one including a retracting mechanism that retracts some of lens groups from the optical axis in order to achieve further reduction in the thickness of the camera at the time of disuse is also put to practical use.

For example, in the image stabilization apparatus disclosed in Japanese Patent Application Laid-Open Publication No. 2011-237519, the image stabilization apparatus is disclosed, that is a image stabilization apparatus including a first moving member that moves in a first direction orthogonal to the optical axis of the optical system with respect to a support member, a second moving member that holds a vibration prevention optical element of the optical system and is supported movably in a second direction orthogonal to the optical axis of the optical system and substantially orthogonal to the first direction with respect to the first moving member, and vibration prevention drive means that performs drive control of the above described first and second moving members in accordance with the magnitude and the direction of blur that is applied to the optical system, and includes attachment/detachment drive means that moves the second moving member between a vibration prevention drive range in which positional control of the second moving member is enabled and a separation position in which the second moving member is out of the vibration prevention drive range, and movement restricting means that determines a moving range of the second moving member by the vibration prevention drive means when the second moving member is in the vibration prevention drive range, and does not restrict movement of the second moving member between the separation position and the vibration prevention drive range by the attachment/detachment drive means.

SUMMARY OF THE INVENTION

In order to attain the above described object, a image stabilization apparatus of one aspect of the present invention includes a support member, a lens holder that holds a lens for vibration prevention and correction, is disposed on the support member, and is movable to be located in a retraction position in which the lens for vibration prevention and correction retracts from a shooting optical system, and in a vibration prevention and correction region where vibration prevention and correction is possible, an urging member that is disposed on the support member and urges the lens holder in a direction of the vibration prevention and correction region, and a lens holder drive member that causes the lens holder to move so that the lens for vibration prevention and correction that is located in the vibration prevention and correction region is located in the retraction position when the lens holder drive member is in a first positional relation to the lens holder, by relatively moving in an optical axis direction of the shooting optical system to each other with respect to the lens holder on the support member, and allows movement of the lens holder so that the lens for vibration prevention and correction that is located in the retraction position moves in the direction of the vibration prevention and correction region when the lens holder drive member is in a second positional relation to the lens holder, wherein when the lens holder and the lens holder drive member are in the second positional relation and the movement of the lens holder is allowed, the lens holder moves so that the lens for vibration prevention and correction is located in the vibration prevention and correction region from the retraction position by the urging member, and in a moved position, rectilinear movement and/or rotational movement of the lens holder is enabled within a plane perpendicular to the optical axis of the shooting optical system.

An advantage of the invention will become more apparent from the following detailed description.

DETAILED DESCRIPTION OF THE PREFERRED EMBODIMENTS

Figure 1:
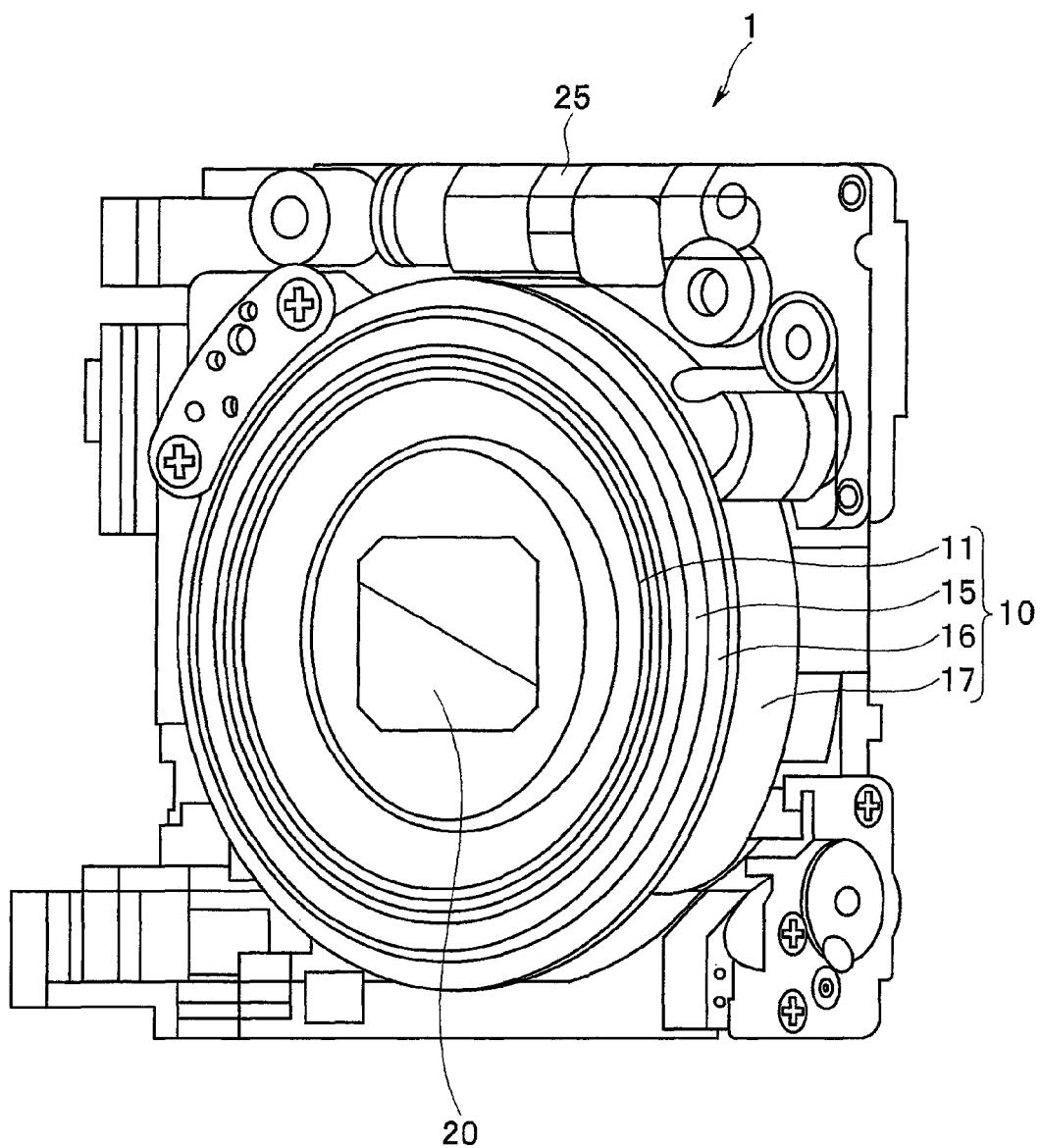
FIG. 1 is a schematic perspective view of a lens barrel unit (a collapsed state) to which a image stabilization apparatus of one embodiment of the present invention is applied.

One embodiment of the present invention is exemplification of a case of application of a image stabilization apparatus to a lens barrel unit for use in a camera that is configured to be able to photoelectrically convert an optical image that is formed by a shooting optical system including, for example, a plurality of optical lenses with use of a solid image pickup device, convert an image signal obtained thereby into digital image data expressing a still image or a movie, record the digital data that is generated in this manner in a recording medium, and reproduce and display the still image or the movie on a display apparatus based on the digital image data recorded in the recording medium. Further, the lens barrel unit exemplified in the present embodiment is the one that adopts a so-called zoom optical system capable of variable magnification operation as the shooting optical system.

Note that in the present embodiment, an optical axis of the shooting optical system in a lens barrel is designated by reference sign O. In a direction along the optical axis O, a side where an object facing a front surface of the camera is located is called a front side, and a side where a light receiving surface (an image forming surface) of an image pickup device disposed at a back surface side of the camera is called a rear side.

Further, in the respective drawings for use in the following explanation, in order to make respective components have such sizes that make the components recognizable in the drawings, the components are sometimes shown with scales thereof made to differ according to component. Consequently, in the present invention, the number and the quantity of the components illustrated in the drawings, the shapes of the components, the ratios of the sizes of the components, and the relative positional relations of the respective components are not limited to only the illustrated forms.

Figure 2:
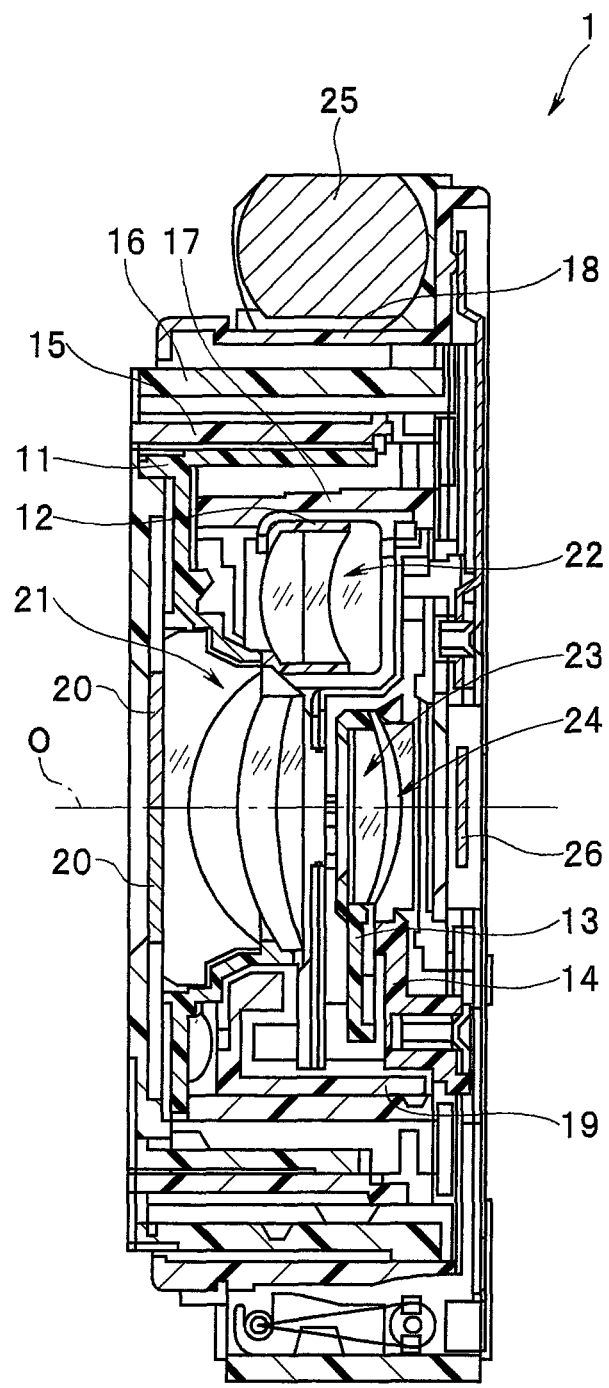
FIG. 2 is a sectional view of the lens barrel unit (the collapsed state) of FIG. 1.
Figure 3:
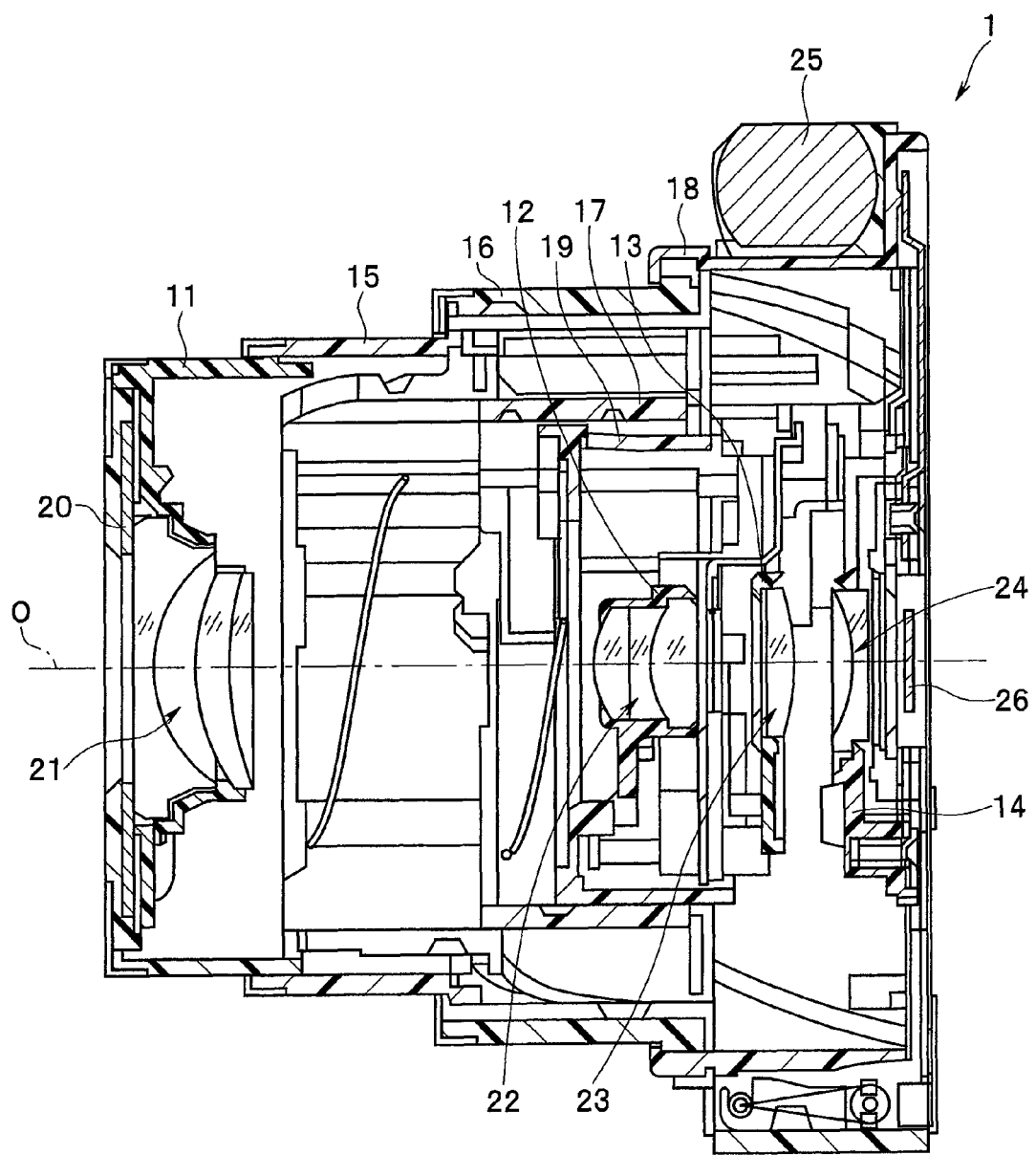
FIG. 3 is a sectional view of the lens barrel unit (a use state; a wide end) of the lens barrel unit of FIG. 1.

FIG. 1 is a schematic perspective view in a collapsed state of the lens barrel unit to which a image stabilization apparatus of one embodiment of the present invention is applied. FIG. 2 and FIG. 3 are sectional views of the lens barrel unit in FIG. 1. Of FIGS. 2 and 3, FIG. 2 shows the collapsed state, and FIG. 3 shows a state in which the shooting optical system is at a wide end position, that is an extended state at a time of use.

Figure 4:
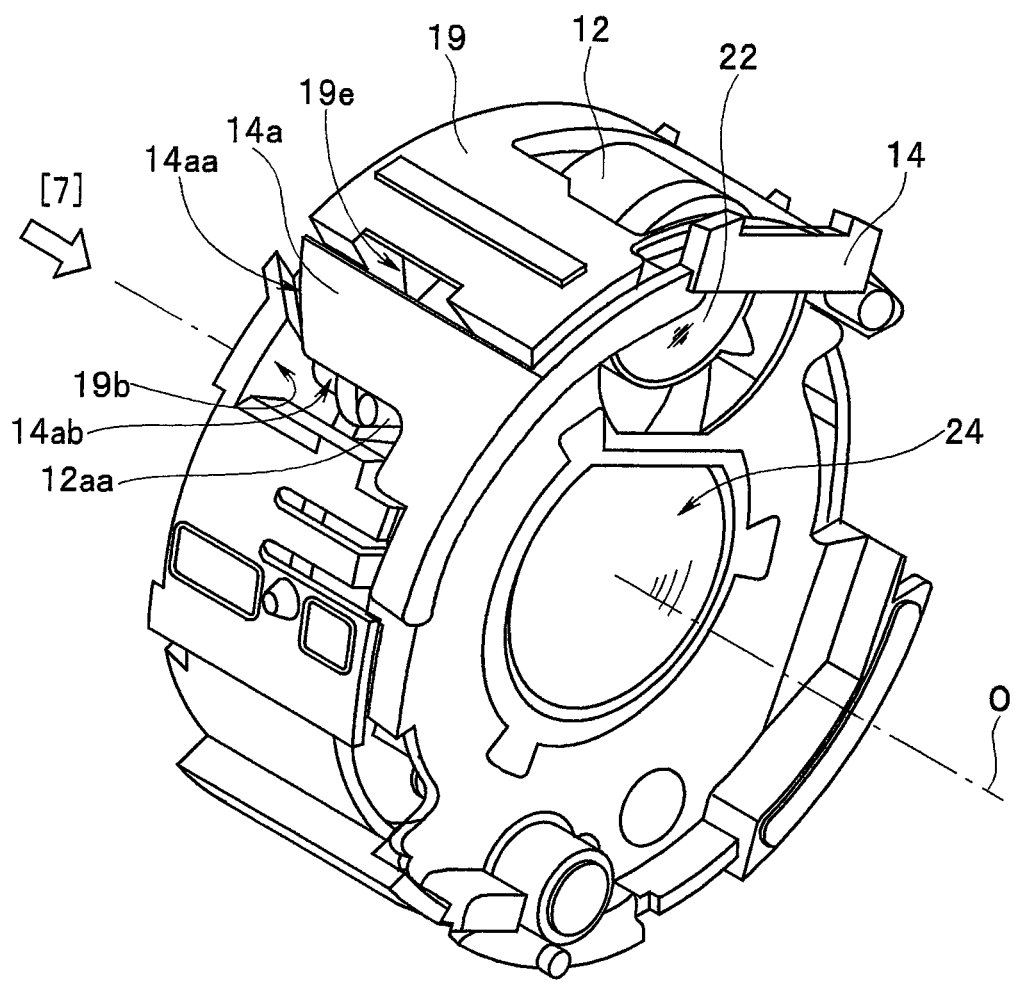
FIG. 4 is an essential part enlarged perspective view at a time of the collapsed state, extracting and showing some (a group 2 barrel, a retraction barrel, a group 4 barrel) of configuring members of the lens barrel unit of FIG. 1.
Figure 5:
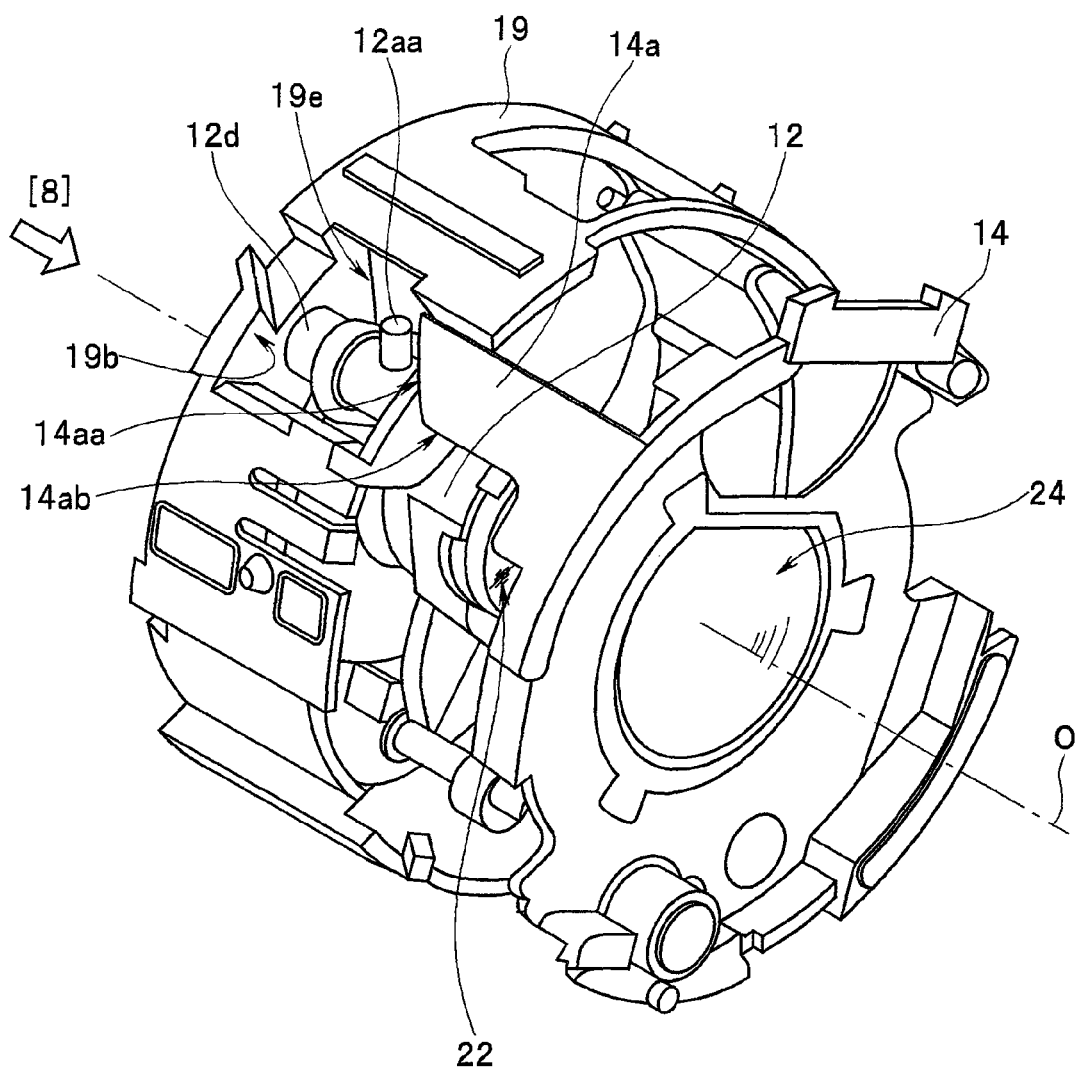
FIG. 5 is an essential part enlarged perspective view at a time of a use state (the wide end) extracting and showing some (the group 2 barrel, the retraction barrel, the group 4 barrel) of the configuring members of the lens barrel unit of FIG. 1.
Figure 6:
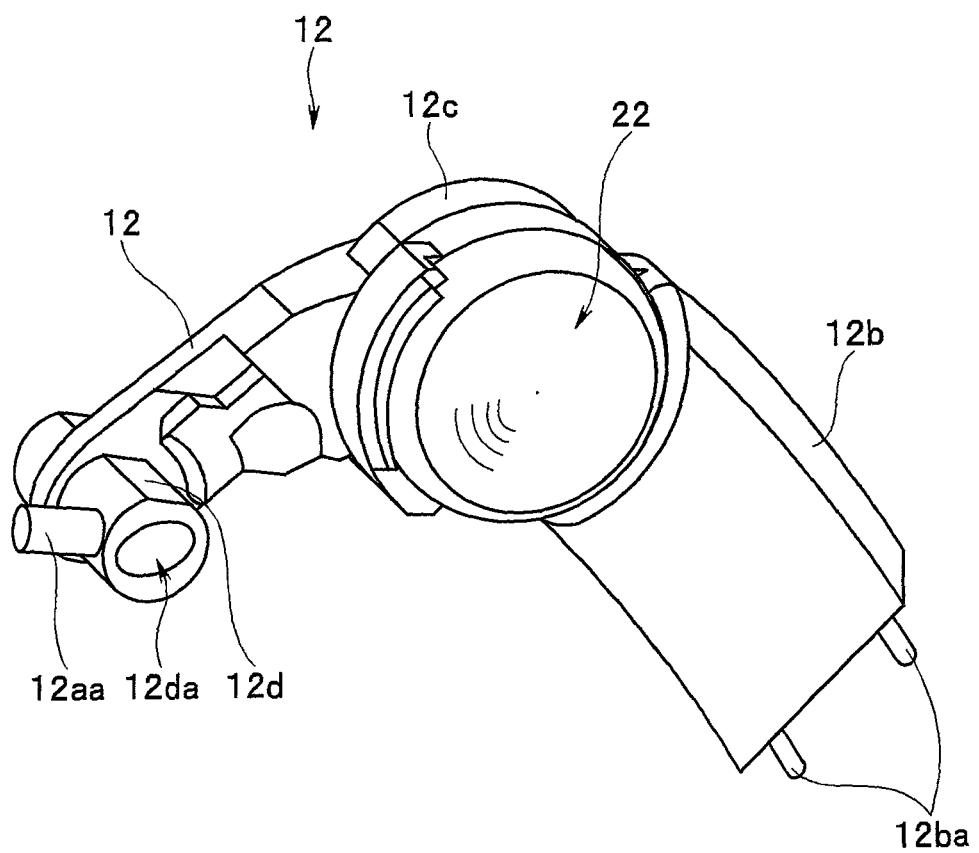
FIG. 6 is an essential part enlarged perspective view extracting and showing one (the retraction barrel) of the configuring members of the lens barrel unit of FIG. 1.
Figure 7:
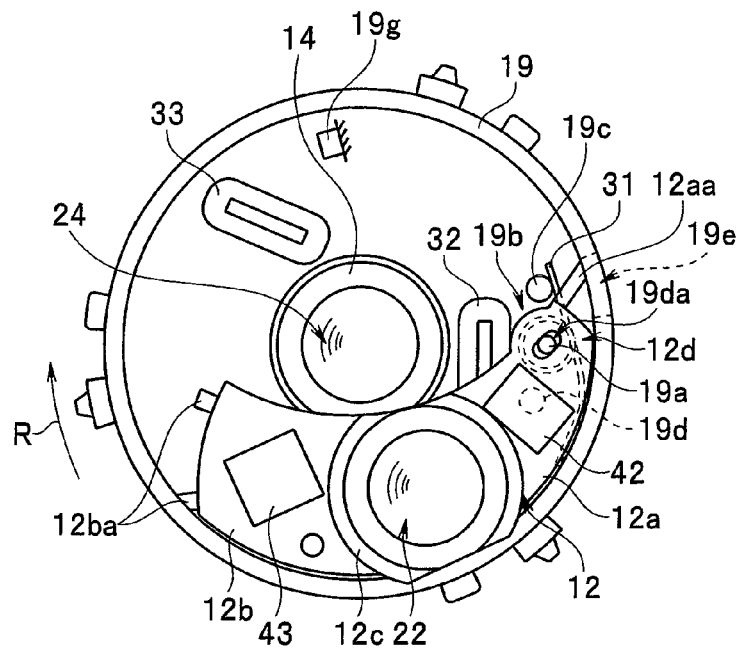
FIG. 7 is a view that is a front view at a time of being seen from an arrow [7] direction of FIG. 4, and shows a state in which the retraction barrel is in a retracted position.
Figure 8:
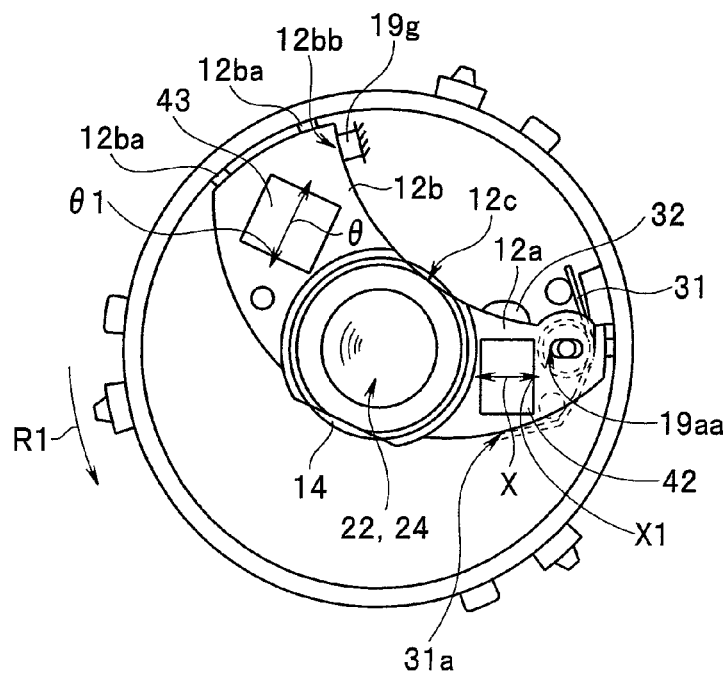
FIG. 8 is a view that is a front view at a time of being seen from an arrow [8] direction of FIG. 5, and shows a state in which the retraction barrel is in a vibration prevention and correction region where vibration prevention and correction is possible at a time of use of the retraction barrel.
Figure 9:
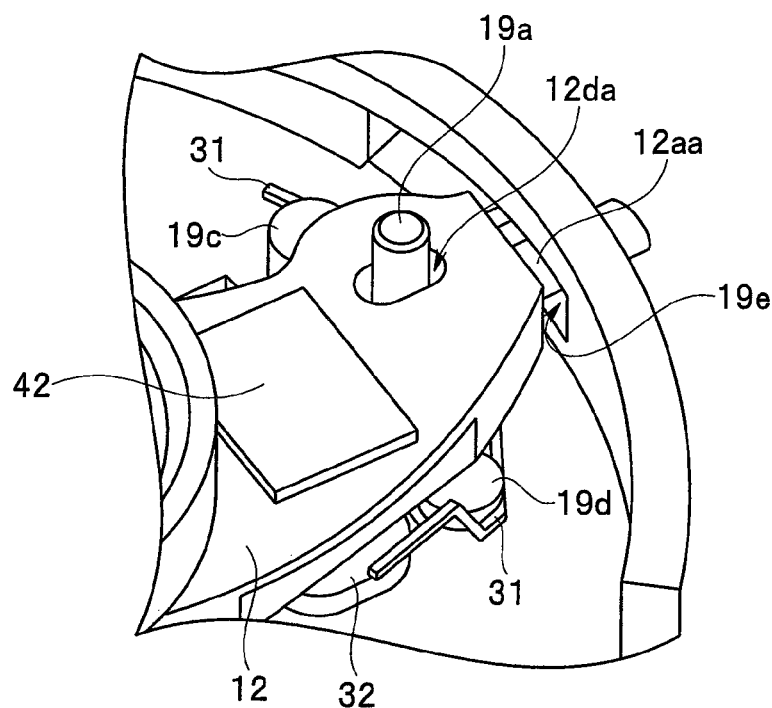
FIG. 9 is an essential part enlarged perspective view showing a configuration of one end portion (a vicinity of first support means and a rotation center) of the retraction barrel in the lens barrel unit of FIG. 1 under enlargement.
Figure 10:
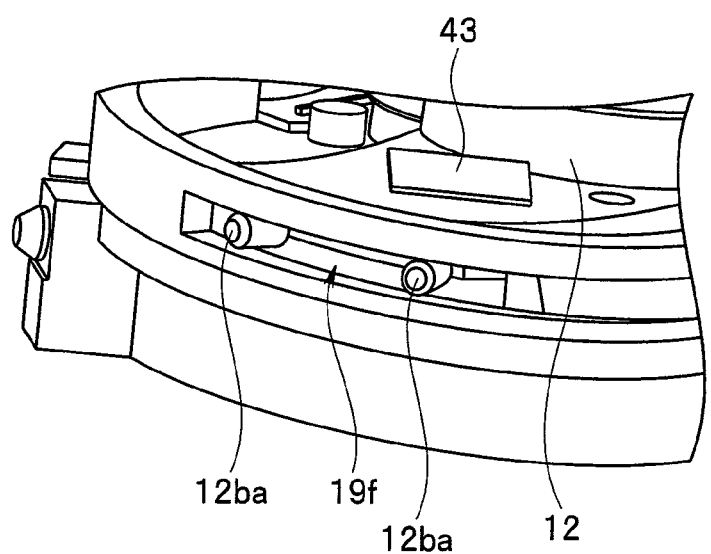
FIG. 10 is an essential part enlarged perspective view showing a configuration of the other end portion (a vicinity of second support means) of the retraction barrel in the lens barrel unit of FIG. 1 under enlargement.
Figure 11:
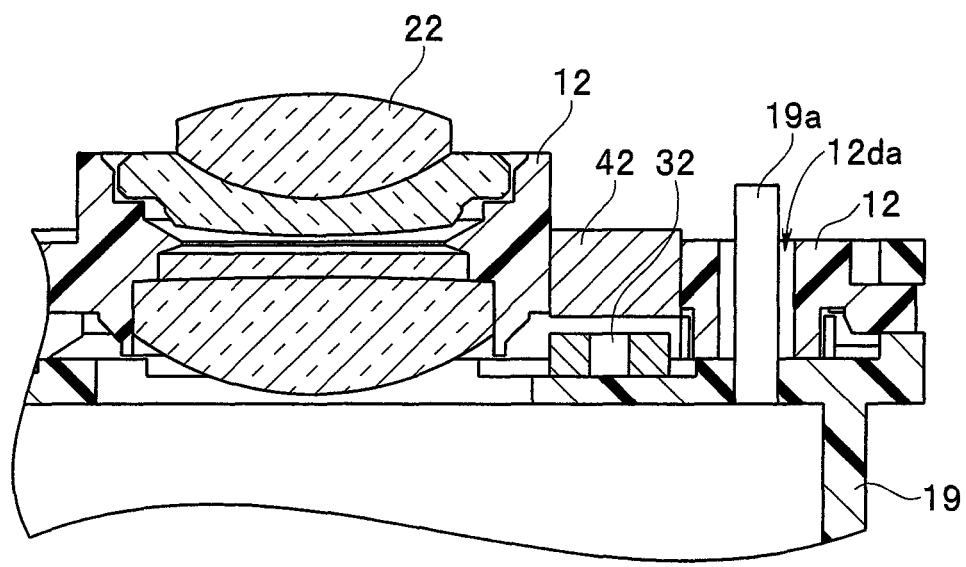
FIG. 11 is an essential part enlarged sectional view showing a section of a site corresponding to FIG. 9.

FIG. 4 and FIG. 5 are essential part perspective views each mainly showing a retraction mechanism by extracting some (a group 2 barrel, a retraction barrel, a group 4 barrel) of configuring members of the lens barrel unit of FIG. 1. Of FIGS. 4 and 5, FIG. 4 shows the collapsed state (state of the retraction position), and FIG. 5 shows the extended state (the wide end position; a non-retracted state) at the time of use. FIG. 6 is an essential part enlarged perspective view extracting and showing only the retraction barrel. FIG. 7 is a front view at a time of being seen from an arrow [7] direction of FIG. 4, and shows a state in which the retraction barrel is located in the retracted position. FIG. 8 is a front view at a time of being seen from an arrow [8] direction of FIG. 5, and shows a state in which the retraction barrel is located in a vibration prevention and correction region where vibration prevention and correction is possible at the time of use. FIG. 9 is an essential part enlarged perspective view showing a configuration of one end portion (a vicinity of first support means and a rotation center) of the retraction barrel under enlargement. FIG. 10 is an essential part enlarged perspective view showing a configuration of the other end portion (a vicinity of second support means) of the retraction barrel under enlargement. FIG. 11 is an essential part enlarged sectional view showing a section of a site corresponding to FIG. 9.

A lens barrel unit 1 is configured by a lens barrel 10 configured by a shooting optical system including a plurality of optical lens groups, a plurality of holding members (barrel members or cylinder members) that respectively hold the respective optical lens groups and the like of the shooting optical system, a drive mechanism or the like that drives the holding members, an image pickup unit including an image pickup device that receives an optical image of an object that is formed by the above described shooting optical system, applies photoelectric conversion processing or the like to the optical image to generate image data in a predetermined form and the like, and the like.

The lens barrel 10 is configured by the shooting optical system, the holding members including a plurality of barrel members and the like, and electric components including a drive source (a motor, an actuator or the like) and electric substrates and the like.

The above described shooting optical system is configured by four lens groups that are a first lens group 21, a second lens group 22, a third lens group 23 and a fourth lens group 24. The four lens groups (21, 22, 23, 24) are respectively held by a plurality of lens holding barrels, namely, a group 1 barrel 11, a retraction barrel 12 included in a group 2 barrel unit, a group 3 barrel 13, and a group 4 barrel 14.

Here, the group 2 barrel unit is configured by the retraction barrel 12 that is a lens holder holding the above described second lens group 22, and a group 2 barrel 19 that is a support member supporting the retraction barrel 12 rotatably in a direction orthogonal to the optical axis O of the shooting optical system. The group 2 barrel unit configures a retracting mechanism for disposing the retraction barrel 12 on the optical axis O and retracting the retraction barrel 12 from the optical axis O by functioning jointly with the above described group 4 barrel 14 that is a lens holder drive member and the like (details will be described later).

Further, the group 2 barrel unit is provided with a image stabilization apparatus that restrains image blur by performing control of causing the retraction barrel 12 to move by a predetermined amount in a predetermined direction at predetermined timing in a direction orthogonal to the optical axis O of the shooting optical system, when the retraction barrel 12 is disposed on the optical axis O (details will be described later).

On one hand, as a plurality of barrel members that configure the lens barrel 10, a drive barrel 15, a rotary barrel 16, a cam barrel 17, a fixed barrel 18 and the like are included besides the above described plurality of lens holding barrels. As a drive source, a zoom motor 25 or the like is placed in a predetermined position.

On the other hand, the image pickup unit is placed in a site near the rear side of the lens barrel 10. The image pickup unit is a configuration unit that is configured by an image pickup device 26 that is a photoelectric conversion element, the electric substrate on which the electric components such as the image pickup device 26 and the like are mounted. The image pickup device 26 is placed so that the image pickup device 26 becomes parallel with a surface orthogonal to the optical axis O on the optical axis O of the shooting optical system, and a substantial center of the light receiving surface substantially corresponds to the optical axis O. Note that as the image pickup device 26, for example, an image sensor using a semiconductor device such as a CCD (charge coupled device), and a CMOS (complementary metal oxide semiconductor), or the like is applied.

At a front surface side of the lens barrel 10, a lens barrier 20 for opening and closing a front surface opening that forms an optical path of the shooting optical system is provided. The lens barrier 20 is configured to be disposed in a closed position that covers an incident opening (an optical path) of the shooting optical system when the lens barrel 10 is in the collapsed state (at the time of disuse of the camera), and disposed at an open position where the incident opening (the optical path) of the shooting optical system is opened when the lens barrel 10 is in an extended state (at the time of use of the camera).

In the lens barrel unit 1 configured as above, when the above described zoom motor 25 as the drive source receives a control signal from a control circuit not illustrated and is driven, a drive force thereof is transmitted to the cam barrel 17 via the drive barrel 15 and the rotary barrel 16. The respective lens holding frames (11, 12, 13, 14) are configured to move to advance and retract properly in a direction along the optical axis O as a result. Accordingly, the lens barrel 10 thereby displaces to the use state in FIG. 3 from the collapsed state of FIG. 2. When drive control for the zoom motor 25 is further performed in this state, the respective barrel members are properly driven to advance and retreat in the optical axis O direction, and as a result, the lens barrel 10 is driven to stretch and contract as a whole. Accordingly, the lens barrel 10 performs a zoom operation of displacing between a wide end position of FIG. 3 and a tele end position not illustrated.

As described above, in the lens barrel 10, all the plurality of lens groups that configure the shooting optical system are disposed on the optical axis O when lens barrel 10 is brought into the use state (at the time of use). When the lens barrel 10 is brought into the collapsed state (at the time of disuse), at least one (the second lens group 22 that is held by the retraction barrel 12 of the group 2 barrel unit in the present embodiment) of the plurality of lens groups that configure the shooting optical system is disposed at the retraction position retracted from the optical axis O, and the other lens groups are configured so that the spaces in the optical axis direction are lessened on the optical axis O (a detailed configuration of the retracting mechanism will be described later).

As above, in the above described lens barrel 10, the second lens group 22 (the retraction barrel 12) as the retraction lens that retracts from the optical axis O at the time of collapse is included, and thereby a contracted length in the optical axis direction at the time of collapse (at the time of disuse) in the lens barrel 10 can be made shorter. Accordingly, from the above, the configuration is provided, that contributes to reduction in thickness (miniaturization) of the camera main body to which the lens barrel 10 is applied. The present lens barrel 10 is provided with the image stabilization apparatus as described above (details will be described later). Consequently, the second lens group 22 held by the above described retraction barrel 12 is a lens for vibration prevention and correction as well as a retraction lens.

Here, a configuration of the retracting mechanism of the retraction barrel 12 in the above described lens barrel 10 will be described in detail hereinafter with use of FIG. 4 to FIG. 10. First, the retraction mechanism of the retraction barrel 12 is mainly configured by the retraction barrel 12, the group 2 barrel 19, the group 4 barrel 14 and the like.

The retraction barrel 12 is a barrel member that fixedly holds the second lens group 22 as shown in FIG. 6. The retraction barrel 12 is formed by having a central cylinder portion 12c including a substantially cylindrical shape, and two arm portions (one arm portion 12a, the other arm portion 12b) that extend to an outer side from an outer circumferential edge of the central cylinder portion 12c, and as for an entire shape thereof, a planar shape seen from the optical axis direction is formed to be a substantially crescent shape, as shown in FIG. 7, FIG. 8 and the like. Namely, the retraction barrel 12 includes a shape in which the one arm portion 12a is extended to one side and the other arm portion 12b is extended to the other side with the second lens group 22 (vibration prevention and correction lens) therebetween.

In the one arm portion 12a out of the two arm portions of the retraction barrel 12, a support hole 12da that is a through-hole penetrating through in a parallel direction with the optical axis O in a distal end portion 12d, and has a section orthogonal to a penetration axis thereof including an elliptical shape (a substantially oval shape) is provided by being bored. A support shaft 19a of the group 2 barrel 19 that will be described later is inserted through the support hole 12da. Accordingly, the retraction barrel 12 is pivotally supported by the support shaft 19a so as to be rotatable within a plane orthogonal to the optical axis O with the support hole 12da as a rotation center.

Further, a center line at a side of a long side of the support hole 12da of the retraction barrel 12 is set to correspond to a straight line that connects the optical axis O of the second lens group 22 that is held by the central cylinder portion 12c and an axial center of the support shaft 19a when the retraction barrel 12 is disposed at a use position. Thereby, the support hole 12da of the retraction barrel 12 (a lens holder) can cause the retraction barrel 12 (the lens holder) to move rectilinearly in a long side direction of the support hole 12da relatively to the group 2 barrel 19 (a support member), and can cause the retraction barrel 12 to move rotationally with the support shaft 19a as an axial center.

Further, a shaft portion 12aa that is provided to protrude to the outer side is provided to be planted on the distal end portion 12d of the one arm portion 12a of the retraction barrel 12. Further, two shaft portions 12ba that are provided to protrude to the outer side are provided to be planted on a distal end of the other arm portion 12b. Namely, in the retraction barrel 12, the shaft portion 12aa (the first support means) is included on the distal end portion 12d of the one arm portion 12a at one end portion side across the second lens group 22 (the vibration prevention and correction lens), and the two shaft portions 12ba (the second support means) is included on the distal end of the other arm portion 12b at the other end portion side across the second lens group 22 (the vibration prevention and correction lens).

The shaft portion 12*aa* is the first support means for rotating itself by being linked with a retraction cam 14*a* of the group 4 barrel 14 (the lens holder drive member). Further, the same shaft portion 12*aa* is a first support shaft that extends along a direction perpendicular to the optical axis O of the shooting optical system. The shaft portion 12*aa* engages with an engaging groove portion 19*e* that is a first engaging portion that is cut out in a direction parallel with the optical axis O in a circumferential side edge portion of the group 2 barrel 19, and has a predetermined width dimension in a circumferential surface direction (see FIG. 9).

Further, the two shaft portions 12*ba* are a second support shaft and a third support shaft that are disposed to extend along a direction perpendicular to the optical axis O of the shooting optical system, and are disposed with a predetermined separation distance given in a circumferential direction. The two shaft portions 12*ba* engage with an engaging groove portion 19*f* that is a second engaging portion that is formed at the circumferential side edge portion of the group 2 barrel 19 and has a width in the circumferential direction (see FIG. 10). Thereby, a range in which the retraction barrel 12 can rotate when the retraction barrel 12 is located in the vibration prevention and correction region is defined. Here, the mutual separation distance of the two shaft portions 12*ba* is set to be smaller than a width dimension of the engaging groove portion 19*f*, and defines the rotation range at the time when the retraction barrel 12 is located in the vibration prevention and correction region.

Note that as the second support means, instead of the two shaft portions 12*ba*, the second support means is configured by a fin-shaped portion having a plane that extends along the direction perpendicular to the optical axis O of the shooting optical system. In this case, a width in the circumferential direction of the plane of the fin-shaped portion is set to correspond to the separation distance of the above described two shaft portions 12*ba*.

Note that here, the position where the retraction barrel 12 retracts from the optical axis O is called a retraction position. A state in which the retraction barrel 12 is located in the retraction position is shown in FIG. 4 and FIG. 7. A state in which the retraction barrel 12 is disposed on the optical axis O is called a use position. A state in which the retraction barrel 12 is located in the use position is shown in FIG. 5 and FIG. 8. Note that when the retraction barrel 12 is located in the use position, the respective lens holding frames that configure the shooting optical system of the lens barrel 10 are in a state in which the respective lens holding frames are capable of performing a zoom operation by advancing and retracting in the optical axis O direction. At the same time, when the retraction barrel 12 is located in the use position, the retraction barrel 12 is in the state located in the vibration prevention and correction region where vibration prevention and correction is possible, by an operation of the image stabilization apparatus that will be described later.

The group 2 barrel 19 has an entire body formed into a substantially cylindrical shape, and in a substantially central portion of a front surface thereof and a rear surface, an opening for an optical path for passing a luminous flux that transmits through the shooting optical system and reaches the light receiving surface of the image pickup device 26 disposed at the rear side of the lens barrel 10 is formed.

In the vicinity of the outer circumferential edge portion of the front surface of the group 2 barrel 19, a wall surface 19*b* that is orthogonal to the center axis (the axis corresponding to the optical axis O) of the cylindrical shape and is provided to protrude toward an inner circumference is formed. On the wall surface 19*b*, the support shaft 19*a* that is disposed toward a rear side parallel with the optical axis O is provided by being planted. The support hole 12*da* is slipped over the support shaft 19*a* as described above.

Further, a helical torsion coil spring 31 that is an urging member is wound around the support shaft 19*a* as shown in FIG. 8 and FIG. 9. The helical torsion coil spring 31 is placed in a state in which the helical torsion coil spring 31 is sandwiched between the wall surface 19*b* of the group 2 barrel 19 and one surface at a front surface side of the distal end portion 12*d* of the one arm portion 12*a* of the retraction barrel 12. The helical torsion coil spring 31 has one arm locked to a spring locking portion 19*c* that is formed at the wall surface 19*b*, and the other arm locked to a spring locking portion 19*d* formed at the same wall surface 19*b*.

In this state, an urging force of the helical torsion coil spring 31 works onto the retraction barrel 12. Namely, the urging force of the helical torsion coil spring 31 acts in a direction to rotate the retraction barrel 12 in a clockwise direction in FIG. 7 (the arrow R direction in FIG. 7) with the support hole 12*da* through which the support shaft 19*a* is inserted as a rotation center.

Namely, the urging force of the helical torsion coil spring 31 rotationally urges the retraction barrel 12 so that the second lens group 22 that is held by the retraction barrel 12 is disposed on a predetermined position on the optical axis O. To put it in simple terms, the helical torsion coil spring 31 is the urging member that is disposed at the group 2 barrel 19 (the support member), and urges the retraction barrel 12 (the lens holder) in a direction of the vibration prevention and correction region that is the use position. Rotational urge of the retraction barrel 12 by the helical torsion coil spring 31 is restricted by one side site 12*bb* of the other arm portion 12*b* of the retraction barrel 12 abutting on a stopper portion 19*g* provided at the group 2 barrel 19.

Further, in other words, the retraction barrel 12 always receives the urging force in the clockwise direction (the R direction) in FIG. 7 of the helical torsion coil spring 31, and by the urging force, the second lens group 22 is urged in the direction of the use position. The one side site 12*bb* of the other arm portion 12*b* of the retraction barrel 12 abuts on the stopper portion 19*g*, and thereby, further rotation is restricted, whereby the retraction barrel 12 is aligned in the predetermined use position.

Namely, the stopper portion 19*g* of the group 2 barrel 19 (the support member) is a stopper member that eliminates and catches the influence of the urging force of the helical torsion coil spring 31 (the urging member) before the retraction barrel 12 (the lens holder) is located in the vibration prevention and correction region.

Note that in the above state, for the retraction barrel 12, movement in the long side direction of the support hole 12*da* is ensured, and in the rotational direction, movement within the range of the predetermined vibration prevention and correction region in which vibration prevention and correction is enabled is also ensured, with the state in which the optical axis of the second lens group 22 and the optical axis O of the shooting optical system substantially correspond to each other as a center.

As above, the above described retraction barrel 12 is a barrel member that holds the second lens group 22 that is a retraction lens and the lens for vibration prevention and correction, and the retraction barrel 12 is disposed on the group 2 barrel 19 (the support member), and has a function as the lens holder that is movable to be located in the retraction position where the second lens group 22 (the lens for vibration prevention and correction) retracts from the optical axis O of the shooting optical system, and in the vibration prevention and correction region that is on the same optical axis O and is capable of vibration prevention and correction.

Further, the support shaft 19a of the group 2 barrel 19 (the support member) is the rotation center at a time of the retraction barrel 12 (the lens holder) rotating between the retraction position and the vibration prevention and correction region, and is a rotation center shaft that engages with the support hole 12da (the oval hole).

At a rear side of the group 2 barrel 19, the group 4 barrel 14 is disposed. The group 4 barrel 14 is a lens holding barrel that is fixed to, for example, a rearmost end portion of the lens barrel 10 and holds the fourth lens group 24. At an outer circumferential edge portion of the group 4 barrel 14, a retraction cam 14a that is provided to protrude to the front side parallel with the optical axis O and has an inclined cam portion 14aa formed at a distal end portion is integrally provided. The retraction cam 14a is formed at a site where the retraction cam 14a engages with an engaging groove portion 19e of the group 2 barrel 19 when the retraction cam 14a is incorporated in the lens barrel 10. As described above, the shaft portion 12aa (the first support means) of the retraction barrel 12 engages with the engaging groove portion 19e (the first engaging portion) of the group 2 barrel 19. Therefore, the inclined cam portion 14aa of the retraction cam 14a is disposed to act on a vicinity of the distal end of the shaft portion 12aa of the retraction barrel 12.

Namely, in a case in which the group 2 barrel 19 moves in the direction along the optical axis O with respect to the group 4 barrel 14 in a fixed state, when the retraction barrel 12 is in the use position (for example, the state of FIG. 5), the inclined cam portion 14aa of the distal end portion of the retraction cam 14a is disposed in the vicinity of the shaft portion 12aa of the retraction barrel 12. When the lens barrel 10 displaces into the collapsed state from the above state, the group 2 barrel 19 moves in the optical axis O direction to be closer to the group 4 barrel 14. Accordingly, the inclined cam portion 14aa of the retraction cam 14a abuts on the shaft portion 12aa of the retraction barrel 12, and thereafter, the shaft portion 12aa moves along a slanting surface of the inclined cam portion 14aa. Thereupon, the shaft portion 12aa is moved in the circumferential direction in the engaging groove portion 19e. By the action, the retraction barrel 12 rotates with the support hole 12da as the rotation center, against the urging force of the helical torsion coil spring 31. After the shaft portion 12aa moves along the inclined cam portion 14aa, the shaft portion 12aa moves along the side edge portion 14ab of the retraction cam 14a, and at this time, the retraction barrel 12 is in a state in which the retraction barrel 12 is already disposed in the predetermined retraction position and does not rotate. Finally, as shown in FIG. 4, the group 2 barrel 19 and the group 4 barrel 14 are brought into an integrated state. By the mechanism as above, the retraction barrel 12 displaces to the retraction position from the use position.

Further, when the retraction barrel 12 is in the retraction position, the group 2 barrel 19 moves in the optical axis O direction to separate from the group 4 barrel 14, whereby the retraction barrel 12 is urged to rotate with the support hole 12da as the rotation center by the urging force of the helical torsion coil spring 31, and finally displaces to the use position.

By the configuration as above, the group 4 barrel 14 functions as a lens holder drive member for driving the retraction barrel 12 by the retraction cam 14a. The retraction cam 14a of the group 4 barrel 14 that is the lens holder drive member is provided to move in the optical axis O direction of the shooting optical system relatively to each other with respect to the retraction barrel 12 (the lens holder) on the group 2 barrel 19 (the support member).

When the retraction cam 14a that is a cam-shaped portion formed at one end portion of the group 4 barrel 14 (the lens holder drive member) is in a positional relation (called a first positional relation) shown in FIG. 4 with respect to the retraction barrel 12 (the lens holder), the retraction cam 14a presses the shaft portion 12aa (the first support shaft), whereby the respective support shafts (12aa, 12ba) of the retraction barrel 12 rotate along the respective engaging groove portions (19e, 19f), and cause the retraction barrel 12 (the lens holder) to move so that the second lens group 22 (the vibration prevention and correction lens) that is located in the vibration prevention and correction region is located in the retraction position. The movement of the retraction barrel 12 to the retraction position is performed during a time period until the lens barrel 10 including the shooting optical system displaces into the collapsed state after a power supply state of the camera (not illustrated) in which the lens barrel unit 1 is incorporated is brought into an off state.

Further, when the retraction cam 14a (the lens holder drive member) is in a positional relation (called a second positional relation) shown in FIG. 5 with respect to the retraction barrel 12 (the lens holder), the retraction cam 14a allows movement of the retraction barrel 12 (the lens holder) so that the second lens group 22 (the vibration prevention and correction lens) that is located in the retraction position moves to the direction of the vibration prevention and correction region. At this time, by the helical torsion coil spring 31 (the urging member), the retraction barrel 12 (the lens holder) is moved so that the second lens group 22 (the vibration prevention and correction lens) is located in the vibration prevention and correction region from the retraction position.

Namely, the group 2 barrel 19 (the support member) moves in the optical axis O direction of the shooting optical system with respect to the retraction cam 14a (the lens holder drive member), and thereby the retraction barrel 12 (the lens holder) rotates on the group 2 barrel 19 (the support member).

Further, the shaft portion 12aa (the first support means) of the retraction barrel 12 also functions as a rotary lever that is rotated by being linked with the retraction cam 14a (the lens holder drive member) of the group 4 barrel 14. Namely, when the retraction cam 14a (the lens holder drive member) acts on the shaft portion 12aa (the first support means), and the retraction barrel 12 (the lens holder) rotates, the retraction barrel 12 rotates with the support shaft 19a (the rotation center shaft) as a center while the shaft portion 12aa (the first support means) of the retraction barrel 12 and the two shaft portions 12ba (the second support means) are respectively supported by the corresponding engaging groove portion 19e (the first engaging portion) and engaging groove portion 19f (the second engaging portion).

Note that in the above described example, the group 4 barrel 14 is described as the fixed lens holding barrel, but the group 4 barrel 14 does not always have to be fixed, and depending on the configuration of the shooting optical system, the group 4 barrel 14 may be also configured to be able to advance and retract in the optical axis O direction. In the above case, the group 2 barrel 19 and the group 4 barrel 14 are configured to move relatively in the optical axis O direction, and when the lens barrel 10 displaces into the collapsed state from the use state, the group 2 barrel 19 and the group 4 barrel 14 are configured to move in a direction to approach each other. Thereby, an action by which the retraction barrel 12 disposed in the group 2 barrel 19 (the support member) is driven in the retracting direction by the retraction cam 14a of the group 4 barrel 14 is ensured.

Namely, the retraction cam 14a (the lens holder drive member) moves in the optical axis O direction of the shooting optical system with respect to the group 2 barrel 19 (the support member), and thereby the retraction barrel 12 (the lens holder) rotates on the group 2 barrel 19 (the support member).

Next, a configuration of the image stabilization apparatus will be described in detail hereinafter mainly with use of FIG. 7 to FIG. 11. First, the image stabilization apparatus of the present embodiment is configured by the retraction barrel 12, a pair of image stabilizing drive sources, a drive controlling circuit that realizes a procedure for controlling the image stabilizing drive sources, and the like.

As the above described image stabilizing drive sources, a pair of VCMs (voice coil motors) that are a VCM (a first coil 32, a first magnet 42) for drive in a rotational direction around the optical axis O, namely, in a theta ($\theta$) direction, and a VCM (a second coil 33, a second magnet 43) for drive in an X direction orthogonal to the optical axis O, and the like are applied. Note that in this case, the theta ($\theta$) direction refers to a direction shown by the arrow $\theta$ in FIG. 8, namely, a direction substantially corresponding to the rotational direction of the retraction barrel 12. Further, the X direction is a direction shown by the arrow X in FIG. 8, and refers to a direction substantially orthogonal to the above described theta direction.

The VCM for drive in the theta direction is configured by the first coil 32 and the first magnet 42. Further, the VCM for drive in the X direction is configured by the second coil 33 and the second magnet 43. Here, the first magnet 42 and the second magnet 43 are placed on predetermined sites of the retraction barrel 12. More specifically, the first magnet 42 is placed at an intermediate site of the one arm portion 12a of the retraction barrel 12. Further, the second magnet 43 is placed at an intermediate site of the other arm portion 12b of the retraction barrel 12.

The first coil 32 and the second coil 33 are disposed at predetermined sites on the group 2 barrel 19. More specifically, the first coil 32 is fixedly disposed at a site on the group 2 barrel 19 side that faces the first magnet 42 when the retraction barrel 12 is disposed in the predetermined use position. The second coil 33 is fixedly disposed at a site on the group 2 barrel 19 side that faces the second magnet 43 when the retraction barrel 12 is similarly disposed in the predetermined use position (see FIG. 7 and FIG. 8).

As described above, the retraction barrel 12 is allowed to move by predetermined amounts in the theta direction and the X direction when the retraction barrel 12 is disposed in the use position, namely, when the retraction barrel 12 is in the vibration prevention and correction region. Here, the movement in the theta direction of the retraction barrel 12 is restricted to an inside of the range at the time of the two shaft portions 12ba (the second support means) of the retraction barrel 12 moving in the circumferential direction in the engaging groove portion 19f (the second engaging portion). Further, the movement in the X direction of the retraction barrel 12 is restricted by an inside of the range in the long side direction of the support shaft 19a in the support hole 12da.

By the configuration as described above, when the retraction barrel 12 (the lens holder) and the retraction cam 14a (the lens holder drive member) are brought into the above described second positional relation and the movement of the retraction barrel 12 (the lens holder) is allowed, the retraction barrel 12 (the lens holder) moves so that the second lens group 22 (the vibration prevention and correction lens) is located in the vibration prevention and correction region from the retraction position, and in the position to which the retraction barrel 12 moves, the retraction barrel 12 can cause the second lens group 22 (the vibration prevention and correction lens) to move rectilinearly (X direction) and move rotationally ($\theta$ direction) in the plane orthogonal (perpendicular) to the optical axis O of the shooting optical system.

Note that the above described first coil 32 is a coil for rectilinear movement for causing the retraction barrel 12 (the lens holder) to move rectilinearly. Further, the above described second coil 33 is a coil for rotational movement for causing the retraction barrel 12 (the lens holder) to move rotationally.

Further, in the aforementioned example, the image stabilization apparatus is configured by the first and the second coils 32 and 33 being disposed on the side of the group 2 barrel 19 (the support member), and the first and the second magnets 42 and 43 being disposed at the positions facing the above described respective coils (32, 33) on the side of the retraction barrel 12 (the lens holder), but is not limited to the above configuration example. For example, contrary to the above described configuration example, a configuration may be adopted, in which the first and the second magnets 42 and 43 are disposed on the side of the group 2 barrel 19 (the support member), and the first and the second coils 32 and 33 are disposed on the side of the retraction barrel 12 (the lens holder).

A flow of an operation at a retraction time out of operations of the retraction barrel 12 at a time of the collapsing operation being performed, in the lens barrel unit 1 configured as above, will be described hereinafter.

The collapsing operation is executed by a power supply state of the camera (not illustrated) in which the lens barrel unit 1 is incorporated being brought into an off state. When the collapsing operation is started, drive control of the zoom motor 25 is performed by a control circuit not illustrated, and the lens barrel 10 (the shooting optical system) is zoomed to the wide end position in the use time. When the lens barrel 10 is disposed at the wide end position of the use time, drive control of the $\theta$ direction driving VCM (32, 42) and the X direction driving VCM (33, 43) are subsequently performed. Here, drive control to a direction (the arrow X1 direction in FIG. 8) in which the shaft portion 12aa can abut on the retraction cam 14a is performed for the X direction driving VCM (33, 43). Further, drive control to a direction (the arrow $\theta$1 direction in FIG. 8) to retract the retraction barrel 12 is performed for the $\theta$ direction driving VCM (32, 42).

By the drive control, the X direction driving VCM (33, 43) causes the support shaft 19a to abut on a one end 19aa of the support hole 12da, and the $\theta$ direction driving VCM (32, 42) causes one side portion of the one arm portion 12a of the retraction barrel 12 to abut on a one end 31a of the helical torsion coil spring 31, as shown in FIG. 8. In this state, engagement with the engaging groove portion 19f of the two shaft portions 12ba of the retraction barrel 12 is released, and the retraction barrel 12 is brought into a state rotatable in the arrow R1 direction in FIG. 8.

Subsequently, when the drive control to the collapsing direction of the lens barrel 10 by the zoom motor 25 is continued, a relative space of the group 2 barrel 19 and the group 4 barrel 14 is shortened, whereby the shaft portion 12aa is pressed by the retraction cam 14a, and the retraction barrel 12 rotates to the predetermined retraction position against the urging force of the helical torsion coil spring 31. After a predetermined time elapses, energization to the $\theta$ direction driving VCM (32, 42) and the X direction driving VCM (33, 43) is brought into an off state. When the retraction barrel 12 is brought into a state disposed in the predetermined retraction position, the drive control of the zoom motor 25 is stopped. Thereby, the collapsing operation is completed.

As described above, according to the above described one embodiment, the retraction barrel 12 that is the lens holder that holds the second lens group 22 being the retraction lens is configured as a part of the image stabilization apparatus so as to be able to move in the vibration prevention and correction region where vibration prevention and correction is possible at the time of use when the retraction barrel 12 is disposed on the optical axis O of the shooting optical system, whereby the lens barrel unit 1 that can perform the retraction operation of the retraction barrel 12 in the collapsing time, and a reliable image stabilization operation in the use time can be realized with the small number of configuring members, and thereby contribution can be made to miniaturization of the unit.

Note that the present invention is not limited to the aforementioned embodiment, and various modifications and applications can be carried out within the range without departing from the gist of the invention as a matter of course. Further, the above described embodiment includes the inventions at various stages, and by proper combination in a plurality of components that are disclosed, various inventions can be extracted. For example, even when some components are deleted from all the components shown in the above described one embodiment, if the problem to be solved by the invention can be solved, and the effect of the invention can be obtained, the configuration from which the components are deleted can be extracted as the invention. The invention is not limited by a specific embodiment except that the invention is limited by the attached claims.

What is claimed is:

1. An image stabilization apparatus, comprising:
    a support member;
    a lens holder that holds a lens for vibration prevention and correction, is disposed on the support member, and is movable to be located in a retraction position in which the lens for vibration prevention and correction retracts from a shooting optical system, and in a vibration prevention and correction region where vibration prevention and correction is possible;
    an urging member that is disposed on the support member, and urges the lens holder in a direction of the vibration prevention and correction region; and
    a lens holder drive member that causes the lens holder to move so that the lens for vibration prevention and correction that is located in the vibration prevention and correction region is located in the retraction position when the lens holder drive member is in a first positional relation to the lens holder, by relatively moving in an optical axis direction of the shooting optical system to each other with respect to the lens holder on the support member, and allows movement of the lens holder so that the lens for vibration prevention and correction that is located in the retraction position moves in the direction of the vibration prevention and correction region when the lens holder drive member is in a second positional relation to the lens holder,
    wherein when the lens holder and the lens holder drive member are in the second positional relation and the movement of the lens holder is allowed, the lens holder moves so that the lens for vibration prevention and correction is located in the vibration prevention and correction region from the retraction position by the urging member, and in a moved position, rectilinear movement and/or rotational movement of the lens holder is enabled within a plane perpendicular to the optical axis of the shooting optical system.

2. The image stabilization apparatus according to claim 1, wherein the support member moves in the optical axis direction of the shooting optical system with respect to the lens holder drive member, and thereby, the lens holder rotates on the support member.

3. The image stabilization apparatus according to claim 1, wherein the lens holder drive member moves in the optical axis direction of the shooting optical system with respect to the support member, and thereby, the lens holder rotates on the support member.

4. The image stabilization apparatus according to claim 1, wherein the support member is provided with a stopper member for eliminating an influence of an urging force of the urging member before the lens holder is located in the vibration prevention and correction region.

5. The image stabilization apparatus according to claim 1, wherein at one of the support member and the lens holder, a rectilinearly moving coil for causing the lens holder to move rectilinearly and a rotationally moving coil for causing the lens holder to move rotationally are disposed, and at the other one of the support member and the lens holder, magnets are disposed in positions facing the respective coils.

6. The image stabilization apparatus according to claim 5, wherein at the lens holder, first support means that is disposed at one end portion side across the lens for vibration prevention and correction and is for rotating the lens holder by being linked with the lens holder drive member, second support means that is disposed at the other end portion side across the lens for vibration prevention and correction, and a long hole for causing the lens holder to move rectilinearly and/or move rotationally relatively to the support member, are disposed,
    at the support member, a rotation center shaft that becomes a rotation center at a time of the lens holder rotating to the retraction position and the vibration prevention and correction region, and engages with the long hole, a first engaging portion with which the first support means engages, and a second engaging portion with which the second support member engages, are disposed, and
    the first support means also has a function of a rotary lever of the lens holder that is rotated by being linked with the lens holder drive member, and at a time of rotation of the lens holder, the first and the second support means are rotatable with the rotation center shaft as a center while the first and the second support means are supported by the corresponding first and second engaging portions.

7. The image stabilization apparatus according to claim 6, wherein the first support means is a first support shaft that extends along a direction perpendicular to the optical axis of the shooting optical system, and the second support means is two support shafts that are second and third support shafts that are disposed to extend along a direction perpendicular to the optical axis of the shooting optical system.

8. The image stabilization apparatus according to claim 6, wherein the first support means is a first support shaft that extends along a direction perpendicular to the optical axis of the shooting optical system, and the second support means is a fin-shaped portion having a plane that extends along a direction perpendicular to the optical axis of the shooting optical system.

9. The image stabilization apparatus according to claim 6, wherein a cam-shaped portion that presses the first support shaft is formed at one end portion of the lens holder drive member, and when the lens holder drive member and the lens holder are in the first positional relation, the cam-shaped portion presses the first support shaft, whereby respective support shafts of the lens holder rotate along the first and the second engaging portions.

10. The image stabilization apparatus according to claim 7, wherein until the shooting optical system is collapsed after a power supply is turned off, the lens holder with the lens for vibration prevention and correction being located in the vibration prevention and correction region is moved in a direction along the first support shaft, and thereafter, the lens holder is rotated to the retraction position.

* * * * *